Feb. 17, 1970     E. W. NELSON     3,495,383
SYSTEM FOR CONDENSATION OF $FeCl_3$
Filed June 18, 1968
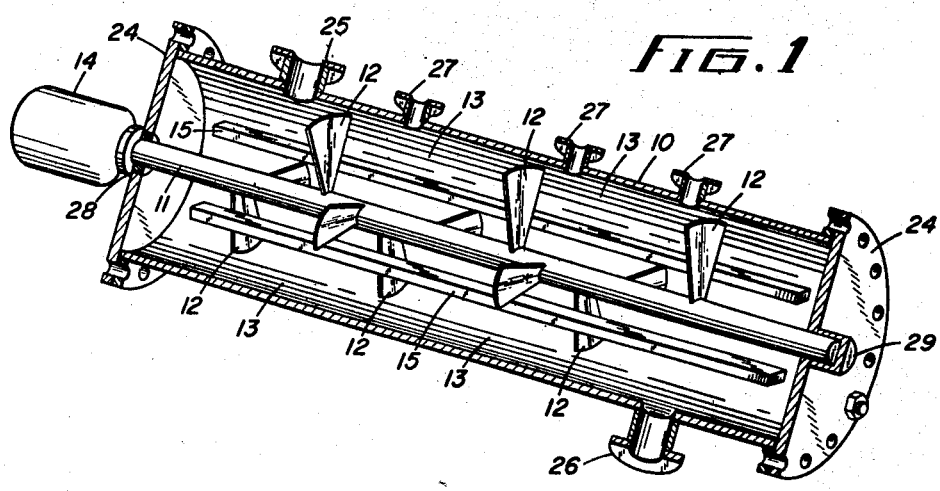
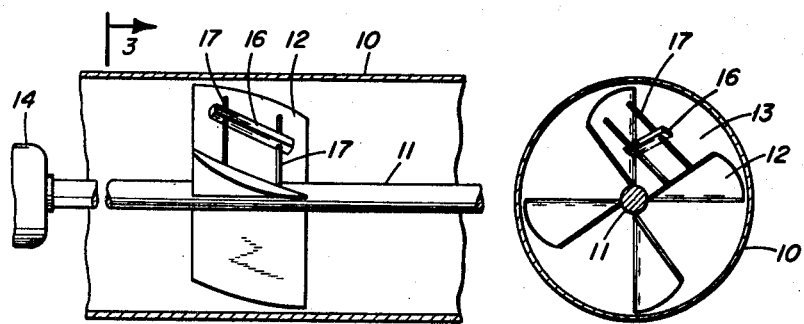
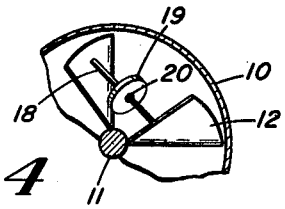
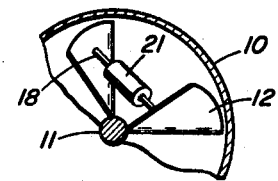
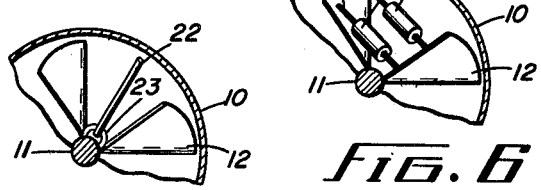
INVENTOR.
EARL WILLIAM NELSON

# United States Patent Office 3,495,383
Patented Feb. 17, 1970

3,495,383
SYSTEM FOR CONDENSATION OF FeCl₃
Earl William Nelson, North Plainfield, N.J., assignor to American Cyanamid Company, Stamford, Conn., a corporation of Maine
Continuation-in-part of application Ser. No. 483,202, Aug. 27, 1965. This application June 18, 1968, Ser. No. 738,026
Int. Cl. B01d 49/00
U.S. Cl. 55—220                 2 Claims

ABSTRACT OF THE DISCLOSURE

An apparatus adapted to separate solid particles from a gas stream and adapted to remove solid particles precipitated on the interior surfaces thereof comprising a cylindrical duct having a rotatable shaft extending axially therethrough and inlet and outlet means arranged to pass a gaseous stream containing solid particles through said duct, means for rotating said shaft about its axis, a plurality of blade means fastened to said shaft and extending radially therefrom into sufficiently close proximity with the interior surface of the wall of said duct to abrade the precipitated solids on said wall with said blade means, each of said blade means being spaced apart from the remaining blade means and movable means for forcefully striking against said blade means in response to rotation of said rotor shaft to thereby remove solid particles deposited on said blade means.

---

This application is a continuation-in-part of application Ser. No. 483,202, filed Aug. 27, 1965, now abandoned.

This invention relates to an apparatus for the condensation and removal of solid particles from a gaseous stream, and in particular, to the condensation and removal of solid iron chlorides or the like, from vapors containing titanium tetrachloride and the subsequent removal of the solid iron chlorides from the apparatus.

During the chlorination of titanium minerals, as for example, ilmenite or rutile, vapors containing titanium tetrachloride, ferrous chloride, ferric chloride and traces of other chlorides and entrained solids, are produced.

It is generally desirable to condense both the ferrous and ferric chlorides before the titanium tetrachloride vapors are condensed since the iron chlorides are substantially insoluble in liquid titanium tetrachloride. Difficulties are encountered in separating the iron chlorides from the liquid titanium tetrachloride in the use of settling, centrifuging or filtration apparatus and methods well known in the art.

Although various methods and apparatus for the purification of titanium tetrachloride are widely known in the art, these have not proven entirely satisfactory in operation. One method consists in subjecting the mixtures of titanium tetrachloride and iron chlorides to the action of interspersed vertically dropping metallic shot, which as a heat absorbent material, will facilitate the condensation of the iron chlorides present, and allow their subsequent removal from the titanium chloride vapors being purified. That particular apparatus, however, has proven itself to be rather cumbersome and in need of frequent maintenance due to the constant wearing and damaging effect of the metallic shot on the apparatus.

Other prior art devices utilize chemical purifying agents for the separation of the iron chlorides and other impurities from the titanium tetrachloride vapors. This, however, quite frequently results in the clogging of the apparatus by the condensing chlorides and subsequent reduction in the efficiency of the process. It is also known to utilize horizontal conveyors having spray chambers whereby titanium tetrachloride liquids are injected into horizontally moving streams of iron chloride vapors at predetermined temperatures, this in effect, causing the condensation of the iron chlorides. The horizontal conveyors, then, may be utilized to remove the condensed solid material which has collected in the apparatus. This type of apparatus is also subject to the disadvantage and problem of excessive clogging of the solids collected and results in the loss of efficiency in the purification of the titanium minerals by chlorination.

The present invention overcomes the foregoing problems encountered in prior art apparatus by providing an improved apparatus for the purification of the titanium tetrachloride through chlorination, concurrent with the removal of the condensed and solidified impurities, such as ferrous and ferric chlorides. The present apparatus consists generally of a horizontal cylindrical duct having a rotating shaft extending therethrough. Fastened to the shaft and rotatable therewith are one or more axial stages of rotating blades or paddles in series and having physical configurations so as to agitate and simultaneously convey a stream of gaseous material or vapors containing titanium tetrachloride, iron chlorides and other materials. At predetermined points along the stream, relative to the axial position of the paddles or blades, controlled amounts of liquid titanium tetrachloride are sprayed into the stream of gases flowing through the cylindrical duct. This, in effect, will cause the mixture of liquid titanium tetrachloride and the other vapors to intermingle and concurrently flow in the same direction through the apparatus as conveyed and agitated by the blades or paddles.

The injection of the liquid titanium tetrachloride into the stream will result in the precipitation or condensation of the iron chlorides. A major proportion of the precipitated iron chlorides will be discharged along with the other materials in the gas stream, in the form of a loose powder. However, portions of the iron chlorides will precipitate into a "smear" or solid form which is largely deposited on the apparatus components, that is, on the internal wall of the cylindrical duct, the surfaces of the rotating blades or paddles and rotating shaft. In order to facilitate the efficient removal of these condensed solids from the apparatus, the present invention advantageously provides for "knocker bars" or other similar means movable relative to and positioned between the rotating blades or paddles. These will remove materials deposited thereon. This removal may be either through a knocking or abrading action on the apparatus components. These means may also comprise collars or disc members slidably mounted on rods so as to be movable oscillatably between adjacent blades or paddles under the influence of gravitational forces in response to the rotation of the apparatus.

In operation, each knocker bar moves freely within the space between adjacent blades in which it is located and through its random pounding and scraping action caused by the rotation of the apparatus, removes condensed solid iron chlorides and other materials from the components of the apparatus, thereby preventing the clogging thereof. The pounding or knocking action of these knocker bar, collar or disc components on the blades or paddles also tends to deflect the shaft of the conveyor from its true axial position in a random fashion in a degree sufficient to cause the radially outermost edges of the paddles to dig into any coatings or layers of material which may have agglomerated or formed on the inside wall of the cylindrical ducting.

Generally, each knocker bar, collar or disc may extend for almost the full axial working length of the conveyor through one or more series stages of blades or paddles. However, in actual use, they are preferably located in the region where the actual condensation of the iron chlorides occurs. This is usually in the zone where the operating temperature of the apparatus and titanium tetrachloride is 175°–225° C.

Although the present invention has been described with respect to the condensation and removal of iron chloride vapors from titanium tetrachloride vapors, it may also be effectively applied to the removal or condensation of aluminum chlorides and aluminum oxychlorides in operations where liquid evaporation is accomplished from sludges which are partially soluble in the liquid which is being evaporated, e.g., for the evaporation of purification sludges which contain the aluminum chlorides and oxychlorides.

The use of the knocker bars, collars or discs, also provides an increase in the heat absorbent area within the apparatus which will assist in the condensation and removal of the iron chlorides, aluminum chlorides and other impurities which may be present in the titanium chloride vapors.

An advantage of the present apparatus is that it provides for the expeditious condensation of iron chlorides present in titanium chloride vapors and the removal thereof from a continuously operating system.

Another advantage of the present apparatus lies in that it may be applied to operations in which liquid evaporation is accomplished from sludges which are partially soluble in the liquid which is being evaporated, as for example, in the evaporation of purification sludges which contain aluminum chloride and aluminum oxychloride.

Accordingly, it is an object of the present invention to provide apparatus for the efficient condensation and removal of iron chlorides and other impurities present in titanium tetrachloride vapors.

Another object of the present invention is in providing an improved apparatus for the condensing and removal of iron chlorides and other impurities from titanium tetrachloride vapors which will restrict any agglomeration or build-up of the solid material and prevent the clogging of the components of the apparatus.

A further object of the present invention is to provide an improved apparatus for the condensing and removal of iron chlorides and other impurities from a stream of titanium tetrachloride vapors with the apparatus having an increased heat absorbent area which will greatly improve the operating characterstics thereof.

The manner in which these and other objects and advantages of this invention will be obtained will become apparent from the following detailed description and drawings, in which:

FIG. 1 is a generally perspective view partly in section of one embodiment of the apparatus according to this invention;

FIG. 2 is a cross sectional elevational view of a second embodiment of the apparatus according to this invention;

FIG. 3 is a sectional view on line 3—3 of FIG. 2;

FIG. 4 is a sectional view similar to that of FIG. 3 showing another embodiment of the present invention;

FIG. 5 is a sectional view similar to that of FIG. 3 showing yet another embodiment of the present invention;

FIG. 6 is a sectional view similar to that of FIG. 3 showing a further embodiment of the present invention; and, FIG. 7 is a sectional view similar to that of FIG. 3 showing a still further embodiment of the present invention.

Referring now in particular to the drawings, the present apparatus, as shown in FIG. 1 includes a generally horizontally positioned cylindrical duct 10 which is provided with end plates 24. The duct 10 is provided with an inlet means 25 for the vaporous feed and an outlet means 26 for the product. The inlet 25 and outlet 26 can be on the same or on opposed surface portions of the cylinder duct 10 as desired. The cylinder duct 10 also can be provided with liquid spray nozzles 27 for the injection of liquid to regulate the temperature in the duct 10. A rotatable shaft 11, positioned in rotary seals 28 and 29, extends coaxially through the duct 10 and has a plurality of blade members 12 fastened thereon. The blade members 12 are of generally paddle shaped configuration and may be welded or brazed to the shaft 11 to thereby form an integral rigid rotor assembly. A plurality of axially spaced paddles or blade series may be employed as required along the shaft. Accordingly, although three blade stages in series are illustrated, this is to be taken as merely illustrative and not in a limiting sense. Duct 10 is provided with one or more openings 27 in the region of the blades 12 in order to permit one or more sprays of liquid titanium tetrachloride to enter the duct and mix with the gaseous material flowing therethrough.

A plurality of the blade members 12 are spaced about the periphery of the shaft 11, and extend radially of the latter into proximity with the duct 10 so as to form a series of sectorial compartments or spaces 13. The blade members 12 are generally twisted along their radial length so as to impart an agitating and conveying effect on the stream of gaseous material passing through the apparatus. Although only four blades are shown spaced about the periphery of the shaft, this is by way of illustration only, and any multiplicity of blades may be used as required. A motor 14 may be used to impart rotative motion to the shaft 11.

In the preferred embodiment of the present invention, a knocker bar 15 having the configuration of an elongated rail member is provided in the space 13 between two adjacent circumferentially spaced blades 12. The rail member 15 generally extends coaxially with duct 10 through a plurality or all of the series of paddle or blade stages. The rail member 15 is completely detached from the rotor assembly and duct 10, and is thereby enabled to move in a random manner with respect to the present apparatus during the operation thereof. Since the rail member 15 is of a larger cross-sectional dimension than the clearance between the tips of blades 12 and the inner wall of duct 10, there is no possibility of the rail member or knocker bar 15 moving from one radially sectorial segment defined by the adjacent blades 12 to another sectorial segment.

During rotation of the rotor assembly, the effects of gravity and centrifugal force will throw the knocker bar 15 about the quadrant in which it is positioned. Alternatively, the knocker bar 15 will rap or abrade in a random fashion against the rotor assembly components or the duct 10. The shock and vibration caused by the rapping action will loosen and remove solids which may have accumulated on these components and cause them to be carried out of the apparatus by the gaseous stream flowing therethrough.

If required, the lower portion of the duct 10 may provide for a conveyor system (not shown) which is adapted to remove through scraping action any solids material which may have agglomerated in the bottom of the duct 10.

In the embodiment shown in FIG. 2 of the drawings, a knocker bar 16 in the shape of an elongate flat plate is provided in the space 13 between two of the blades 12. The knocker bar 16 extends for substantially the entire axial length of the blades 12 and is apertured adjacent to each end. Two rods 17 are fastened in parallel spaced relation to the two blades encompassing the knocker bar, and are positioned to each pass through one of the apertures in the knocker bar 16, whereby the latter is slideably journaled on the bars.

Rotation of the shaft 11 and blades 12 will cause the knocker bar 16 to impinge upon or rap against either one blade or the other depending upon the rotative position of the blades. This rapping or knocking action will jar loose any material deposited upon the blades 12, shaft 11 or any other component in the apparatus due to the vibration generated. Additionally, the rapping of the knocker bar 16 against the blade 12 will create an instantaneous imbalance and resultant deflection in the rotor shaft 11. The deflection of the shaft 11 will force the radially outermost edge of blade 12 to come into closer proximity with the wall of the duct 10, thereby removing any material which may have accumulated thereon.

The embodiments illustrated in FIGS. 4 to 7 of the drawings are primarily modifications of the knocker bar 16 shown in FIGS. 2 and 3.

In the embodiment of FIG. 4 the blades 12 are interconnected by a cylindrical rod 18. A disc 19 having a centrally located aperture 20 is positioned so as to be slideable upon the rod between the two contiguous blades 12. The impinging of the disc 19 against one or the other of the blades will produce the desired rapping or vibratory effect needed to remove solid material which has collected on the apparatus components. The sliding action of the disc 19 on the rod 18 will also abrade material which may have collected on the latter.

FIG. 5 shows an embodiment similar to that of FIG. 4, however, in lieu of the disc 19, the rod 18 is provided with a collar 21. Collar 21 is apertured permitting it to slide on the rod 18 in response to the rotative motion of the apparatus.

The embodiment shown in FIG. 6 is like that of FIG. 5, with the distinction residing in that a plurality of rods 18 and collars 21 are used. An advantage of this construction lies in that additional impact forces are provided by the multiplicity of collars 21. Also a substantial increase in the heat absorbent area of the apparatus is contemplated by this construction. Although only two rods and collars are illustrated, any quantity as required and practicable, may be utilized.

Illustrated in the embodiment of FIG. 7 is a single knocker bar 22 in the form of an elongate rod. The knocker bar 22 extends radially outwardly of shaft 11 for substantially the entire radial length of blades 12. An arcuate member 23 is fastened to shaft 11 between two adjacent blades 12. Knocker bar 22 is apertured to facilitate its mounting on arcuate member 23 whereby it may swing between the blades 12 and impinge thereagainst.

Although only a single axial stage of blades or paddles comprising the knocker bars, discs or collars of the present invention are shown, it may be readily understood by one skilled in the art, that two or more axial stages of blades may utilize the features of this invention.

I claim:
1. An apparatus adapted to separate solid particles from a gas stream and adapted to remove solid particles precipitated on the interior surfaces thereof comprising a generally horizontally positioned cylindrical duct having a rotatable shaft extending axially therethrough and inlet and outlet means arranged to pass a gaseous stream containing solid particles through said duct, said duct provided with end plates having rotary seals axially positioning said shaft, motor means for rotating said shaft about its axis, said duct provided with spray nozzles for injection of coolant, a plurality of paddle shaped blade means fastened to said shaft and extending radially therefrom into sufficiently close proximity with the interior surface of the wall of said duct to abrade the precipitated solids on said wall with said blade means, each of said blade means being spaced apart from the remaining blade means so as to define a series of sectorial spaces therebetween and movable means for forcefully striking against said blade means in response to gravitational forces resulting from the rotation of said rotor shaft, wherein each of said blade means is axially spaced apart from the remaining blade means and said movable means comprises at least one freely movable elongated bar member, said member having a minimum cross-sectional dimension greater than the clearance between the tips of said blade means and said interior surface wall, each bar member extending generally parallel to the axis of said duct means and through a plurality of said sectorial spaces whereby removal of deposited solid particles on said blade means and on said interior surface is achieved by the free-falling impact of said bar member.

2. The apparatus of claim 1 having a conveyor system adapted to scrape a portion of the interior duct wall to remove agglomerated solid particles.

References Cited

UNITED STATES PATENTS

| | | | |
|---|---|---|---|
| 64,603 | 5/1867 | Walters | 209—382 |
| 125,819 | 4/1872 | Lewis | 209—382 |
| 1,449,592 | 3/1923 | Eggert | 241—183 X |
| 1,756,835 | 4/1930 | Sackett | 209—382 |
| 2,755,502 | 7/1956 | Herr | 241—170 X |
| 2,831,665 | 4/1958 | Baerfuss | 15—246.5 X |
| 2,870,869 | 1/1959 | Mahler | 261—92 X |
| 3,020,025 | 2/1962 | O'Mara | 259—9 X |
| 3,022,046 | 2/1962 | Breig | 165—92 X |
| 3,130,070 | 4/1964 | Potters et al. | 259—9 X |
| 3,159,007 | 12/1964 | Rahauser et al. | 259—9 X |
| 3,190,624 | 6/1965 | McElreath | 261—92 |
| 3,216,485 | 11/1965 | Speca | 15—104.04 X |
| 3,263,748 | 8/1966 | Jemal et al. | 165—87 |
| 3,291,205 | 12/1966 | Harris et al. | 165—94 |
| 3,372,910 | 3/1968 | Estis | 259—178 |
| 2,009,251 | 7/1935 | Edgar et al. | 261—90 |
| 2,105,782 | 1/1938 | Fauth | 165—94 X |
| 2,458,440 | 1/1949 | Stafford | 165—92 X |
| 2,540,250 | 2/1951 | Feldstein et al. | 165—92 X |
| 2,803,309 | 8/1957 | Baker | 261—90 X |
| 3,412,573 | 11/1968 | Paulivkonis | 165—87 X |

FOREIGN PATENTS

| | | |
|---|---|---|
| 332,974 | 9/1903 | France. |
| 396,648 | 8/1933 | Great Britain. |
| 475,324 | 11/1937 | Great Britain. |
| 985,720 | 3/1965 | Great Britain. |

HARRY B. THORNTON, Primary Examiner

D. E. TALBERT, JR., Assistant Examiner

U.S. Cl. X.R.

15—104.04; 55—267, 300; 165—87; 259—9; 261—90